United States Patent [19]

Vicari et al.

[11] Patent Number: 5,004,796

[45] Date of Patent: Apr. 2, 1991

[54] PREPARATION OF POLY(ARYLATE) USING A NON-SOLVENT

[75] Inventors: Richard Vicari, Chatham; John R. Costanza, Plainfield; Ronald R. Lamonte, Flanders; Ralph M. Miano, Summit, all of N.J.

[73] Assignee: Hoechst Celanese Corporation, Somerville, N.J.

[21] Appl. No.: 464,395

[22] Filed: Jan. 12, 1990

[51] Int. Cl.⁵ .................. C08G 63/02; C08G 63/18; C08G 63/00; C08G 67/00
[52] U.S. Cl. .................................. 528/179; 528/176; 528/191; 528/194; 528/271
[58] Field of Search ............... 528/179, 176, 191, 194, 528/271

[56] References Cited

U.S. PATENT DOCUMENTS

| | | | |
|---|---|---|---|
| 4,294,956 | 10/1981 | Berger et al. | 528/179 |
| 4,374,239 | 2/1983 | Berger et al. | 528/176 |
| 4,533,720 | 8/1985 | Yu | 528/125 |
| 4,725,647 | 2/1988 | Maresca et al. | 525/68 |

Primary Examiner—Harold D. Anderson
Assistant Examiner—T. Mosley
Attorney, Agent, or Firm—Depaoli & O'Brien

[57] ABSTRACT

A polyarylate is formed by reacting a mixture of a diester of a dihydric phenol, at least one aromatic dicarboxylic acid and an inert diluent comprising a poly(fluorinated alkylene oxide). Polyarylates of improvided color can be formed and the diluent can be easily separated from the polyarylate and reaction byproducts.

30 Claims, No Drawings

PREPARATION OF POLY(ARYLATE) USING A NON-SOLVENT

BACKGROUND OF THE INVENTION

This invention is directed to a process for producing polyarylates using a diluent which can be easily separated from the reaction products Polyarylates are polyesters derived from a dihydric phenol, particularly 2,2-bis(4-hydroxyphenyl)propane, also identified as bisphenol-A, and an aromatic dicarboxylic acid, particularly mixtures of terephthalic and isophthalic acids. These polyarylates are high temperature, high performance thermoplastic polymers with a good combination of thermal and mechanical properties. They also have good processability which allows them to be molded into a variety of articles.

Many processes have been described in the literature for the preparation of polyarylates. One such process is the diacetate process. In the diacetate process, a dihydric phenol is converted to its diacetate, which is then reacted with an aromatic dicarboxylic acid(s) to form the polyarylate.

However, the polyarylates produced by the diacetate process have a tendency to be colored which could make them unsuitable in some end use applications. Thus, there is a desire to improve the color of the polyarylate for such end use applications.

In addition, there are other problems in the diacetate process for producing polyarylates which must be economically and practically solved in order to have a viable, economically attractive process. One problem occurs when the reaction takes place in the molten state. In such molten reaction, sublimation of the diacid occurs. This disrupts the stoichiometry of the reaction and the polyarylate produced is not of acceptable molecular weight. Another problem when a diester derivative of a dihydric phenol is reacted with an aromatic dicarboxylic acid in the molten state is that the viscosity of the system increases dramatically towards the end of the reaction and therefor the reaction becomes diffusion controlled (the molecules are not close enough to insure rapid reaction) rather than kinetically controlled. Also, the polymer product is difficult to handle (i.e., removal from the reactor) due to this high viscosity.

Yet another problem in the production of polyarylates by the diacetate process is that a carboxylic acid is a by-product of the reaction. In order to provide an efficient, economical process and a high molecular weight polyarylate, the acid, for example, the acetic acid has to be conveniently and efficiently removed.

U.S. Pat. No. 4,294,956 discloses that the reaction of the diester derivative of a dihydric phenol with the aromatic dicarboxylic acid can be carried out in a diphenyl ether solvent which is present in amounts of from about 10 to about 60, based on the weight of the polyarylate produced. The diphenyl ether compound may be substituted. These substituents are selected from alkyl groups, chlorine, bromine or any substituent which does not interfere with the polyarylate forming reaction or the reaction forming the diester derivative of the dihydric phenol. Additionally, the diphenyl ether compound may be used with up to 50 weight percent of other compounds, such as various biphenyls or any other compounds which do not interfere with the polyarylate forming reaction or the reaction forming the diester derivative of the dihydric phenol. A preferred solvent comprises a eutectic mixture of diphenyl oxide and biphenyl, which solvent is a liquid at room temperature which is marketed under the name Dowtherm A from Dow Chemical Corp.

The utilization of from about 10 to about 60 percent of a diphenyl ether compound in the diacetate process reduces sublimation of the aromatic dicarboxylic acid; thus producing polyarylates of acceptable molecular weight. Also, the diphenyl ether compound provides for better removal of the acetic acid by-product. Further, an additional benefit is that the viscosity of the system is decreased. This decrease in viscosity provides a faster reaction time since better mixing of the reactants occurs which allows the reaction to proceed under kinetic control. Additionally, reaction times are relatively short so that a polyarylate is produced generally in less than 10 hours at the reaction temperatures and the polyarylates produced possess lighter color, as compared to those utilizing longer reaction times.

While the formation of polyarylates by the diacetate process has worked sufficiently well utilizing a diphenyl ether diluent such as disclosed in U.S Pat. No. 4,294,956, there still remains the problem of separating the diphenyl ether from the acetic acid byproduct. Thus, the diphenyl ether and acetic acid form a solution necessitating additional process steps to recover the diluent for return to the polymerization process. Moreover, polyarylate color still remains a problem even when using the diluent in polymer formation.

Other diluents or solvents have been suggested for producing polyarylates by the diacetate process. For example, U.S. Pat. No. 4,374,239 discloses polymerizing the diester of a dihydric phenol with an aromatic dicarboxylic acid in the presence of at least one halogenated and/or etherated substituted aromatic or heteroaromatic compound. Examples include 1,2, 4-trichlorobenzene, 1,4-dimethoxy benzene and o-dichlorobenzene. Many other examples are cited in the patent disclosure.

U.S. Pat. No. 4,533,720 discloses forming polyarylates by the diacetate process utilizing a gamma-butyrolactone as a diluent. The patent discloses that this diluent reduces sublimation of reactants resulting in higher molecular weight polymers.

There is still a need to provide a useful diluent for preparing polyarylates by the diacetate process which will have the advantages of the prior art in reducing sublimation of the monomeric components and thus produce polyarylates of acceptable molecular weight and color and to reduce the viscosity of the polymerization system. There is also a need to provide a diluent which will facilitate better removal of the acetic acid byproduct and at the same time be easily separated from the acetic acid byproduct for recycling.

SUMMARY OF THE INVENTION

The present invention is directed to an improved polymerization process for preparing low color, high molecular weight aromatic polyesters. The process comprises reacting a diester of a dihydric phenol, or an acid anhydride and a dihydric phenol, with an aromatic dicarboxylic acid, or a mixture of aromatic dicarboxylic acids, in the presence of a diluent comprising a poly(fluorinated alkylene oxide) having the repeating unit:

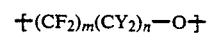

wherein m is an integer from 1–10, n is an integer from 0–5, Y is the same or different and represents hydrogen or halogen.

DESCRIPTION OF THE INVENTION

The present invention is directed, in general, to an improved process for the preparation of normally solid amorphous polyarylates having an intrinsic viscosity of from about 0.45 to greater than 1.0 dl/gm, which process comprises reacting a diester derivative of a dihydric phenol with an aromatic dicarboxylic acid or a mixture of aromatic dicarboxylic acids in the presence of a poly(fluorinated alkylene oxide) diluent.

The present process comprises reacting:

(a) at least one diester derivative of a dihydric phenol having the following formula:

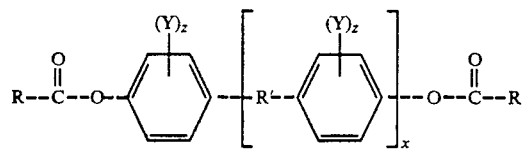

wherein R is independently selected from hydrogen, an alkyl radical having from 1 to about 6 carbon atoms, preferably methyl, cycloalkyl having from 4 to about 7 carbon atoms, or aryl, Y is independently selected from alkyl groups of 1 to 4 carbon atoms, chlorine or bromine, z independently has a value of from 0 to 4, inclusive, and R' is independently selected from a divalent saturated aliphatic hydrocarbon radical, particularly alkylene or alkylidene radicals having from 1 to 8 carbon atoms or halogenated derivatives thereof, especially $C(CH_3)_2$, $C(CX_3)_2$; wherein X is a halogen, preferably fluorine, cycloalkylene or cycloalkylidene radicals having up to and including 9 carbon atoms, halogenated derivatives thereof, O, S, SO, $SO_2$, and CO, x is 0 or 1; and (b) at least one aromatic dicarboxylic acid.

The diester derivative of the dihydric phenol is prepared by reacting a dihydric phenol with an acid anhydride derived from acids containing from 1 to 8 carbon atoms under conventional esterification conditions. The preferred acid anhydride is acetic anhydride. Although the diester derivative of the dihydric phenol can be formed prior to reaction with the aromatic dicarboxylic acid, it is preferred to perform the reaction in one vessel in which the aromatic dicarboxylic acid, dihydric phenol and acid anhydride are added simultaneously. Thus, the reaction can be represented below using as reactants terephthalic acid, bisphenol-A and acetic anhydride.

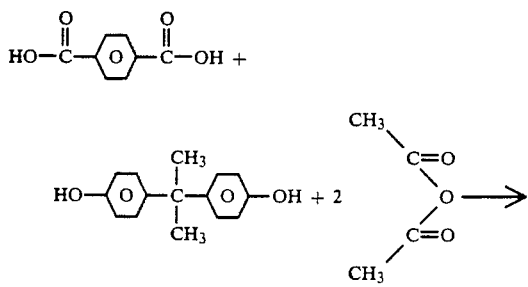

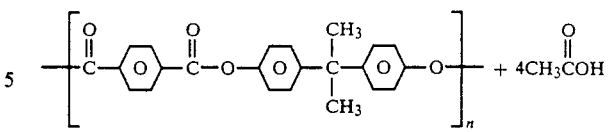

The dihydric phenols that may be used in this invention include but are not limited to the following:
2,2-bis-(4-hydroxyphenyl)propane,
2,2-bis-(4-hydroxyphenyl)hexafluoropropane
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)ethane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxyphenyl)pentane,
3,3-bis-(4-hydroxyphenyl)pentane,
2,2-bis-(4-hydroxyphenyl)heptane,
1,2-bis-(4-hydroxyphenyl)-1,2-bis-(phenyl)-propane,
4,4'-(dihydroxyphenyl)ether,
4,4'-(dihydroxyphenyl)sulfide,
4,4'-(dihydroxyphenyl)sulfone,
4,4'-(dihydroxyphenyl)sulfoxide,
4,4'-(dihydroxybenzophenone),
hydroquinone, and
naphthalene diols.

These dihydric phenols may be used individually or in any combination. It is also possible to add up to 50 wt. % based on the total diol content of aliphatic diols, such as neopentyl glycol. The preferred dihydric phenol is 2,2-bis(4-hydroxyphenyl)propane (bisphenol-A).

The aromatic dicarboxylic acids that may be used in this invention include terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents such as halides, alkyl or aryl ethers, and the like. Preferably, mixtures of isophthalic and terephthalic acids are used such as in a ratio ranging from 85:15 to 15:85. More preferably, the isophthalic acid to terephthalic acid ratio in the mixture is about 80:20 to 50:50. An especially preferred mixture comprises 75:25 isophthalic acid to terephthalic acid. Also, from about 0.5 to about 20 percent of aliphatic diacids containing from 2 to about 10 carbon atoms, such as adipic acid, sebacic acid, and the like may be additionally used in the polymerization reaction.

Moreover, use of small quantities of polyhydric phenols (3 or more OH groups) to produce long-chain branching and, otherwise, modify polymer properties may also be practiced. Similarly, small amounts of polycarboxylic acids may be used.

The reaction of the diester derivative of a dihydric phenol with the aromatic carboxylic acid is carried out in a diluent comprising a poly(fluorinated alkylene oxide) having repeating units as follows:

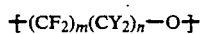

wherein m is an integer from 1-10, n is an integer from 0-5, Y is the same or different and represents hydrogen or halogen including F, Cl or Br. The poly(fluorinated alkylene oxide) can be either a straight or branched chain structure.

It is preferred that the polyether diluent be perfluorinated. Examples of the useful aliphatic polyethers of the present invention include poly(tetrafluorethylene oxide), poly(hexafluoropropylene oxide), poly(fluorinated butylene oxide), copolymers formed from different fluorinated alkylene oxides, etc. The polyethers of the present invention are a non-solvent for the polyarylate which is formed and further, will separate from the acetic acid byproduct to form a separate layer therefrom. Thus, removal of the diluent can be achieved by decantation of the diluent layer which then can be recycled to the polymerization stage. The polyether diluents of this invention are non-flammable and non-toxic.

The poly(fluorinated alkylene oxides) of the present invention are of relatively low molecular weight. Thus, molecular weights ($M_n$) of about 600-20,000 are typical with molecular weights of about 600-5,000 being more typical and preferred. The polyethers of the present invention should be present in amounts of from about 10 to about 60 wt. % based on the weight of the total charge. Preferred amounts of the diluent range from about 10 to about 40 wt. % and most preferably from about 10-30 wt. % based on total charge.

The amount of the poly(fluorinated alkylene oxide) oligomer can vary during the polymerization reaction. For example, it may be advantageous to increase progressively the amount of the diluent to maintain the reaction medium at about constant viscosity.

The reaction of the diester derivative of the dihydric phenol with the aromatic dicarboxylic acid is performed with the diester and acid reactants present in a diester/acid ratio of from about 0.85-1.10 and, preferably, from about 0.97-1.03 to provide an intrinsic viscosity of at least 0.5 dl/g.

The process of this invention is carried out at a polymerization temperature of from about 200° to about 350° C. and preferably, from about 275° to about 305° C. The present process is generally conducted in an inert atmosphere (such as argon or nitrogen). It is desirable to maintain the reaction temperature as low as possible to prevent the coloration of polymer while as high a reaction temperature as possible is preferred in terms of the rate of reaction. The process is initially carried out at atmospheric pressure or super atmospheric pressure and the pressure is reduced as polymerization proceeds. Near the end of polymerization, pressure as low as 0.5 torr absolute may be used.

Catalysts may be used to accelerate the rate of polymerization. All the conventional catalysts being capable of accelerating an ester exchange reaction are usable. Suitable examples of catalysts are salts or compounds of elements selected from Groups 1A, 2A, 2B, 3A, 4A and 5A of the periodic table of elements. Examples include metal oxides (e.g., magnesium oxide, lead oxide, zinc oxide, antimony trioxide); alkoxides which are prepared by the reaction of an alcohol or glycol and an alkali metal, alkaline earth metal, aluminum or titanium; sodium acetate and sodium benzoate; metal hydrides and metal borohydrides (e.g., lithium hydride, potassium borohydride ($K_2B_2H_6$). The preferred catalyst is an alkali metal salt and most preferred are lithium and potassium salts including the acetates, carbonates, benzoates, formates, bicarbonates, hydroxides, phosphates and monohydrogen phosphates of lithium or potassium. The lithium salts are especially preferred including lithium acetate, carbonate and hydroxide. The catalyst is added in amounts between about 5-100 ppm based on polymer, preferably about 20-50 ppm, and most preferably about 25 ppm.

An adjunct catalyst may also be used. Examples include the imidazole catalysts disclosed in U.S. Pat. No. 4,612,360 herein incorporated by reference. Specific examples include 1-methylimidazole, 1-ethylimidazole, 2-ethyl-4-methylimidazole, and benzimidazole.

A cobalt salt may be added to the reaction medium along with the esterification catalyst, to act as cocatalyst and as well to yield a polyarylate of improved color, in particular, improved Hunter b color in which the yellowness of the polyarylate is substantially reduced. As disclosed in copending, commonly assigned U.S. Ser. No. 356,692, it has been found that cobalt has a catalytic effect in the "diacetate process" and has also been found to reduce the yellow color in the "as-prepared" polyarylates formed by the present diacetate process. Any cobalt salt may be used as the cocatalyst to improve polyarylate color including but not limited to cobalt acetate, cobalt benzoate, cobalt carbonate, cobalt phenate, and the cobalt salt of aliphatic or isoaliphatic carboxylic acids which contain 3 to 20 carbon atoms, such as cobalt 2-ethylhexanoate. The cobalt salt can be added directly to the monomeric components or, more preferably, to insure solubility and uniform dispersion of the cobalt salt, the cobalt salt can be dissolved in a solvent prior to addition. Any conventional solvent may be used. In general, the cobalt salt should be added in sufficient amounts to yield at least about 20 ppm, preferably at least 25 ppm of cobalt in the final polymer. Below these levels, some color improvement has been found although water white color is not achieved. More preferably, the amount of cobalt should range from about 30 ppm to 60 ppm based on the final polymer. Preferred polyarylate color has a value of less than 2.0 on the Hunter b scale.

The polymerization reaction is conducted for a period of time sufficient to produce a polyarylate having an intrinsic viscosity of at least about 0.45 to greater than 1.0 dl/gm, which time is generally in the range of from about 4 hours to about 8 hours, depending on the particular polyarylate being prepared.

The polymerization reaction of this invention may be carried out batchwise or continuously by using appropriate staging and by using suitable apparatus. Moreover, the reactants may be added to the polymerization zone in any way or order desired.

The diester derivative of the dihydric phenol may be formed in situ by adding the dihydric phenol together with the acid anhydride, an aromatic dicarboxylic acid and poly(fluorinated alkylene oxide) diluent to the reactor and the reaction carried out in a single reaction zone under combined esterification and polymerization conditions as described above. Additionally, the diester derivative of the dihydric phenol may be first prepared and then an aromatic dicarboxylic acid and diluent added directly to the same reaction vessel with the polymerization being carried out under the conditions described above.

The polyarylate polymer having an intrinsic viscosity of at least about 0.45 dl/g is recovered in its final form by methods well known to those in the art, such as by direct devolatilization in an extruder under conditions sufficient to remove the diphenyl ether compound, coagulation, spray drying, and the like.

The polyarylates may also be prepared by first forming a polyarylate prepolymer having an intrinsic viscosity of from about 0.1 to about 0.4 dl/gm, by reacting the diester derivative of a dihydric phenol with an aromatic dicarboxylic acid under the conditions described previously, for a reaction time of about 3 hours. Under batch conditions, the polyarylate prepolymer is then heated at temperatures of from about 275°–305° C. to obtain a polyarylate having an intrinsic viscosity of from about 0.45 to greater than 1.0 dl/gm.

Alternatively, the polyarylate prepolymer may be added directly, after its formation, to a vented extruder or other suitable continuous reactor wherein the molecular weight is increased to form a polymer having an intrinsic viscosity of from about 0.45 to greater than about 1.0 dl/gm. For example, the molecular weight of a polyarylate prepolymer is increased in the extruder at a temperature of from about 320 to about 360° C., under pressure of about 0.3 to about 2 torr and a residence time of from about 5 to about 30 minutes.

The process of this invention produces normally solid polyarylates having an intrinsic viscosity of from about 0.45 to greater than about 1.0, preferably from about 0.55 to 0.70 dl/gm, as measured in 1,1,2,2-tetrachloroethane at 30° C. It has been found that as the intrinsic viscosity increases beyond the preferred levels, the color of the polyarylate becomes less acceptable.

The polyarylates may be prepared in the presence of materials such as molecular weight regulators, antioxidants, and the like. The polyarylates obtained by the process of this invention may be used together with the well-known additives such as plasticizers, pigments, lubricating agents, mold release agents, stabilizers, inorganic fillers, and the like. These polyarylates may also be blended with other polymers.

Although, more specifically disclosed as useful in forming polyarylates by the diacetate process, the fluorinated diluent of the present invention is believed to be useful in other polyarylate melt polycondensation processes including the melt transesterification of the diphenyl ester of an aromatic dicarboxylic acid and a bisphenol as disclosed in, for example, U.S. Pat. No. 4,319,017, herein incorporated by reference. The diluent of this invention would provide the same benefits in such melt processes as described above with respect to the diacetate process including operating as a non-solvent for the polymer, enhancing byproduct separation and lowering the system viscosity.

The following examples are for the purpose of illustrating the invention and should not be construed so as to unduly restrict the invention to the specific embodiments shown.

EXAMPLES 1–10

Prepolymer procedure for each example was as follows:

A 2-liter three-neck flask was charged with bisphenol-A (362.5 g), isophthalic acid (197.5 g), terephthalic acid (66.5 g), acetic anhydride (333.0 g), Hostinert 272 (420 g) and cobalt acetate (0.078 g) and lithium hydroxide (0.088 g) catalyst at room temperature. Hostinert 272 is a poly(perfluorinated propylene oxide), B.P. of 272° C., Hoechst A.G. The flask was fitted with a thermowell, a mechanical stirrer and a vigreaux column attached to a distillation head. The contents were stirred at 100 rpm under atmospheric conditions. The following temperature program was followed using a West temperature controller:

| Stage | temp. (°C.) | ramp | dwell |
|---|---|---|---|
| 1 | 140 | 30 min. | 30 min. |
| 2 | 280 | 110 min. | 60 min. |

The temperature was increased according to the program. Distillation of acetic acid began after the dwell at 140° C. Overhead liquid was collected into a graduated pressure equalizing funnel. As the volume of Hostinert increased into the overhead, the liquid in the receiver separated into two layers. The bottom layer was Hostinert 272 and the top layer was acetic acid plus other by-products. The prepolymer program was run until all the sublimate was washed back into the reactor and the molten solution was homogeneous. The prepolymer was poured into pans and allowed to cool. Upon cooling the prepolymer solidified into an opaque white solid.

Postpolymerization procedure for each example was as follows:

The formed prepolymer was driven to high molecular weight by a postpolymerizing procedure. The prepolymer (50 g) was placed into a reactor that was stirred while under vacuum. Overhead was collected into a graduate cylinder. The prepolymer was first dried under full vacuum at 100° C. for 1 hour. The temperature was then ramped to 290° C. At 290° C. vacuum pulldown began. After 15 minutes, the vacuum was turned on full. The prepolymer was kept under vacuum (0.05 mmHg) for 45 minutes. As the molecular weight increased, the melt viscosity rapidly increased. Therefore, it was necessary to reduce the stirring speed to prevent the polymer from crawling up the stirrer shaft. The final polymer was isolated and intrinsic viscosity and Hunter color were measured. Table 1 shows the results of the polyarylate made with the Hostinert poly(fluorinated alkylene oxide) diluent.

TABLE 1

| Example # | Intrinsic IV | Hunter YI |
|---|---|---|
| 1 | 0.72 | 2.30 |
| 2 | 0.60 | 0.94 |
| 3 | 0.59 | 1.13 |
| 4 | 0.57 | −1.48 |
| 5 | 0.53 | 2.90 |
| 6 | 0.52 | 0.42 |
| 7 | 0.50 | 1.25 |
| 8 | 0.47 | 0.95 |
| 9 | 0.47 | 0.12 |
| 10 | 0.46 | 1.37 |

All examples had very good color (low YI values) and good IV. A YI value below 5 is considered water white and IV's from 0.45 to 0.60 are good.

EXAMPLE 11–14

The stability of various solvents at elevated temperature and in the presence of acetic anhydride was tested.

Dowtherm-A was heated in the presence of 2 wt. % acetic anhydride for 5 hours. The reflux temperature reached 235° C. Color formation appeared after one hour at 235° C. The yellow color gradually turned to yellowish-brown. This color did not seem to increase after this point. It is believed that acetic anhydride either reacted with Dowtherm-A to give acylated diphenyl ether and/or biphenyl or there was a degradation of the diphenyl ether into phenolic compounds.

Diphenyl ether was refluxed in the presence of acetic anhydride (2 wt. %) under $N_2$ for 1.5 hrs. The acetic anhydride was then distilled off. The solution was very yellow.

Multitherm PG-1 (aliphatic hydrocarbon), Multitherm Corporation was heated with acetic anhydride (2 wt. %) for 4 hours. The solution was heterogeneous at room temperature but became homogeneous at 80° C. After four hours of refluxing (149° C.), the excess acetic anhydride was distilled off. The resulting Multitherm had a slight yellow color compared to Dowtherm-A. Color formation did not occur until the temperature of the diluent reached 220° C.

The next diluent was Hostinert 272. The diluent was heated with 2 wt. % acetic anhydride in the same manner as described above. There was no evidence of any color formation even after 6 hours of refluxing. Acetic anhydride has no appreciable solubility in the Hostinert solvent.

Table 2 lists the various solvents and results from testing. The results show that there is a color forming reaction between the solvent and the anhydride. No color was observed when the solvents were heated alone under the same conditions. There is evidence that polyarylates will discolor in the presence of acetic anhydride at high temperatures.

TABLE 2

| Example # | Solvent | Acetic anhydride | Comments |
|---|---|---|---|
| 11 | Dowtherm A | no | Clear, colorless |
|  |  | yes | Yellow |
| 12 | Diphenyl ether | no | Clear, colorless |
|  |  | yes | Dark yellow |
| 13 | Multitherm | no | Clear, colorless |
|  |  | yes | Light yellow |
| 14 | Hostinert 272 | no | Clear, colorless |
|  |  | yes | Clear, colorless |

What is claimed is:

1. In a process for the production of polyarylates by reacting under esterification conditions a reaction mixture of a diester of a dihydric phenol, at least one aromatic dicarboxylic acid and an inert diluent, the improvement wherein said diluent is a poly(fluorinated alkylene oxide).

2. The improved process of claim 1 wherein said poly(fluorinated alkylene oxide) has the repeating unit:

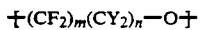

wherein m is an integer from 1-10, n is an integer from 0-5, Y is the same or different and represents hydrogen or halogen.

3. The improved process of claim 2 wherein said repeating unit is perfluorinated.

4. The improved process of claim 1 wherein said inert diluent is poly(perfluorinated propylene oxide).

5. The improved process of claim 1 wherein said diluent has a number average molecular weight ($M_n$) of 600-20,000.

6. The improved process of claim 1 wherein said diluent has a number average molecular weight ($M_n$) of 600-5,000.

7. The improved process of claim 1 wherein said dihydric phenol is bisphenol-A.

8. The improved process of claim 1 wherein said aromatic dicarboxylic acid is a member selected from the group consisting of isophthalic acid, terephthalic acid and mixtures thereof.

9. The process of claim 8 wherein said aromatic dicarboxylic acid is a mixture of isophthalic acid and terephthalic acid.

10. The improved process of claim 9 wherein the mole ratio of isophthalic acid to terephthalic acid is about 3:1.

11. The improved process of claim 1 wherein an alkali metal polyesterification catalyst is added to said reaction mixture.

12. The improved process of claim 11 wherein said alkali metal comprises lithium.

13. The improved process of claim 1 wherein cobalt is added to said reaction mixture in an amount of at least 20 ppm relative to the polymer which is formed.

14. The improved process of claim 13 wherein said cobalt is added to said reaction mixture in an amount of from between about 30 to 60 ppm based on polymer.

15. The improved process of claim 1 wherein said diester of a dihydric phenol is the diacetate.

16. The improved process of claim 15 wherein said diacetate of the dihydric phenol is produced in-situ during said reacting by reaction of acetic anhydride and said dihydric phenol.

17. The improved process of claim 16 wherein said dihydric phenol is bisphenol-A.

18. The improved process of claim 17 wherein said aromatic dicarboxylic acid is a member selected from the group consisting of isophthalic acid, terephthalic acid and mixtures thereof.

19. The process of claim 18 wherein said aromatic dicarboxylic acid is a mixture of isophthalic acid and terephthalic acid.

20. The improved process of claim 19 wherein the mole ratio of isophthalic acid to terephthalic acid is about 3:1.

21. The improved process of claim 19 wherein an alkali metal polyesterification catalyst is added to said reaction mixture.

22. The improved process of claim 21 wherein said alkali metal comprises lithium.

23. The improved process of claim 21 wherein said polyesterification catalyst is lithium hydroxide.

24. The improved process of claim 23 wherein cobalt is added to said reaction mixture in the form of a cobalt salt.

25. The improved process of claim 16 wherein said reacting is completed in two stages, a first stage to form a prepolymer having an intrinsic viscosity of less than about 0.45 dl/g in 1,1,2,2 tetrachloroethane at 30° C. and a post polymerization stage wherein said prepolymer is polymerized at temperatures of at least about 275° C. to form a polyarylate having an intrinsic viscosity of greater than 0.45 dl/g in 1,1,2,2 tetrachloroethane at 30° C.

26. The improved process of claim 1 wherein said diluent is added in amounts of 10 to 60 wt. % based on said reaction mixture.

27. The improved process of claim 26 wherein said inert diluent is present in amounts of from about 10 to 40 wt. %.

28. In a process for the production of polyarylates by reacting under melt esterification conditions a mixture of a bisphenol or ester forming derivative thereof and, at least one aromatic dicarboxylic acid or ester forming derivative thereof, the improvement which comprises adding a diluent which is a non-solvent for said polyarylate and which comprises a poly(fluorinated alkylene oxide).

29. The improved process of claim 28 wherein said poly(fluorinated alkylene oxide) has the repeating unit:

$$-(CF_2)_m(CY_2)_n-O-$$

wherein m is an integer from 1-10, n is an integer from 0-5, Y is the same or different and represents hydrogen or halogen.

30. The improved process of claim 29 wherein said inert diluent is perfluorinated.